United States Patent [19]

Kenmochi et al.

[11] Patent Number: 5,002,333

[45] Date of Patent: Mar. 26, 1991

[54] UNDER FRAME OF A MOTOR VEHICLE

[75] Inventors: Toshihisa Kenmochi; Hiroshi Suzuki; Haruo Watanabe, all of Wako, Japan

[73] Assignee: Honda Giken Kogyo Kabushiki Kaisha, Tokyo, Japan

[21] Appl. No.: 230,542

[22] Filed: Aug. 10, 1988

[30] Foreign Application Priority Data

Aug. 11, 1987 [JP] Japan .................. 62-122040[U]

[51] Int. Cl.[5] ............................................. B62D 21/00
[52] U.S. Cl. ..................................... 296/204; 296/208
[58] Field of Search ............... 296/244, 203, 209, 194, 296/195

[56] References Cited

U.S. PATENT DOCUMENTS

| 2,226,790 | 12/1940 | Valletta | 296/204 |
| 3,419,303 | 12/1968 | Eggert, Jr. et al. | 296/204 |
| 4,457,555 | 7/1984 | Draper | 296/203 |
| 4,712,829 | 12/1987 | Hurten et al. | 296/204 |

*Primary Examiner*—Robert R. Song
*Attorney, Agent, or Firm*—Armstrong, Nikaido, Marmelstein, Kubovcik, & Murray

[57] ABSTRACT

An underframe of a motor vehicle includes side sill frames extending along and at opposite sides of a floor portion of a passenger compartment, and tunnel frames extending in the same direction as and interposed between the side sill frames. Each of the side sill frames and tunnel frames has a top-open channel configuration. Front side frames are also provided with a top-open channel configuration. Straight portions of the side sill frames and tunnel frames are individually connected at their front ends to the front side frames by top-open channel-like connecting portions such that the channels of those frames are communicated to each other. The underframe having such a structure is easy to produce and provided with extreme rigidity and strength.

6 Claims, 4 Drawing Sheets

UNDER FRAME OF A MOTOR VEHICLE

BACKGROUND OF THE INVENTION

The present invention relates to an underframe which serves as the framework of the body of a motor vehicle and, more particularly, to an underframe of a motor vehicle which includes side sills.

While the body of a motor vehicle is in many cases provided with a monocoque structure, the mechanical strength and rigidity of, among others, a large-size motor vehicle often relies on the underframe. Generally, such an underframe is made up of front and rear side frames respectively positioned in a front and a rear part of a vehicle body, and floor frames associated with that part of the floor of a passenger compartment which intervenes between the front and rear side frames. In the case of a passenger car, the underframe is additionally provided with side sills at opposite sides of the floor of the passenger compartment. To insure the rigidity of a vehicle body, the various frames and the side sills have to be firmly connected to each other.

The various members constituting the underframe of a passenger car as stated above each plays the role of a strength member of the vehicle body and therefore usually has a channel configuration. Such channel members cooperate with vehicle body panels which are connected thereto to define hollow closed sections. In a prior art underframe, the front side frames, for example, are provided with a side-open channel configuration and a front side panel is connected to the open side of each front side frame to define a closed section. The side sills are each implemented by a pair of side-open channel-like panels which are connected face-to-face to each other to define a closed section. Further, the floor frames are configured as a top-open channel members and cooperate with a floor pannel which is connected to their upper surfaces to define a closed section.

In a passenger car, a dashboard is provided to isolate an engine compartment side where the front side frames are disposed from a passenger compartment side where the side sills are disposed. The dashboard has also to be connected to the front side frames, floor frames and side sills. It is impossible to connect the dashboard to the upper surfaces of the side-open front side frames and those of the side-open side sills because flanges protrude upward from such frames. Usually, therefore, the front side frames, floor frames and side sills are interconnected by a front outrigger which extends in the lateral direction of the vehicle body, and the dashboard is connected to the upper surface of the outrigger. The outrigger is provided with a top-open channel configuration.

A problem with such a prior art implementation is that the side-open channel members such as the front side frames and side sills and the top-open channel members such as the front outrigger cannot be interconnected except at their side surfaces. In this condition, a load acting on one of associated member is transferred to only one side surface of the other member, resulting in poor transmission of load. This in turn lowers the efficiency of the underframe as a framework.

In light of the above, Japanese Laid-Open Patent Publication (Kokai) No. 57-140281 proposes a front outrigger with a twisted tubular configuration for interconnecting a front side frame and a side sill. Such a front outrigger successfully allows the closed section of the front side frame and that of the side sill to communicate with each other to thereby increase the strength of the framework. However, producing a twisted tubular outrigger by press-forming is extremely difficult and therefore requires disproportionate cost.

Further, the floor frame has hitherto been connected to the underside of a major part of a floor panel. Therefore, the dimension of the floor frame as measured in the up-down direction cannot be increased beyond a certain limit which is dependent upon the ground clearance, limiting the rigidity available against bending forces.

SUMMARY OF THE INVENTION

It is therefore an object of the present invention to provide an underframe of a motor vehicle which is rigid, strong, and highly productive.

It is another object of the present invention to provide an underframe of a motor having hollow closed sections which communicate with each other over the entire body of the vehicle.

It is another object of the present invention to provide an underframe of a motor vehicle which has a sufficient dimension as measured in the up-down direction.

An underframe of a motor vehicle of the present invention comprises front side frames provided in a front portion of a vehicle body, side sill frames extending in a longitudinal direction of the vehicle body at opposite sides of a floor portion of a passenger compartment, and tunnel frames extending in the longitudinal direction of the vehicle body at opposite sides of a floor tunnel which is located at the intermediate between the side sill frames. The front side frames, side sill frames and tunnel frames each has a top-open channel configuration. The side sill frames and tunnel frames each includes a straight portion which is connected at a front end of the straight portion to associated one of the front side frames by a connecting portion having a top-open channel configuration and contiguous with the frame.

BRIEF DESCRIPTION OF THE DRAWINGS

The above and other objects, features and advantages of the present invention will become more apparent from the following detailed description take with the accompanying drawings in which.

DESCRIPTION OF THE PREFERRED EMBODIMENTS

Figure 1:
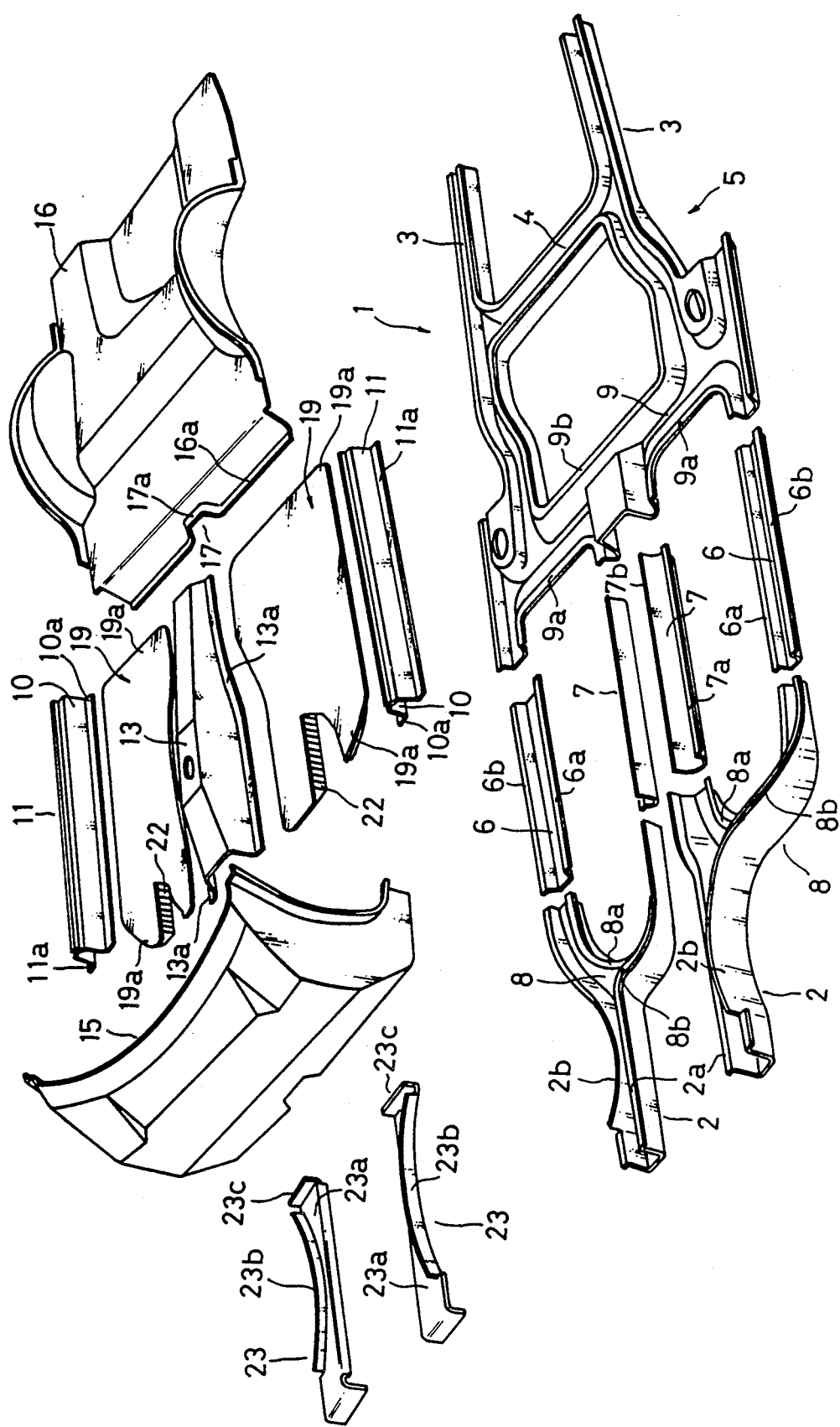
FIG. 1 is an exploded view of a lower part of a vehicle body to which an underframe structure embodying the present invention is applied.
Figure 2:
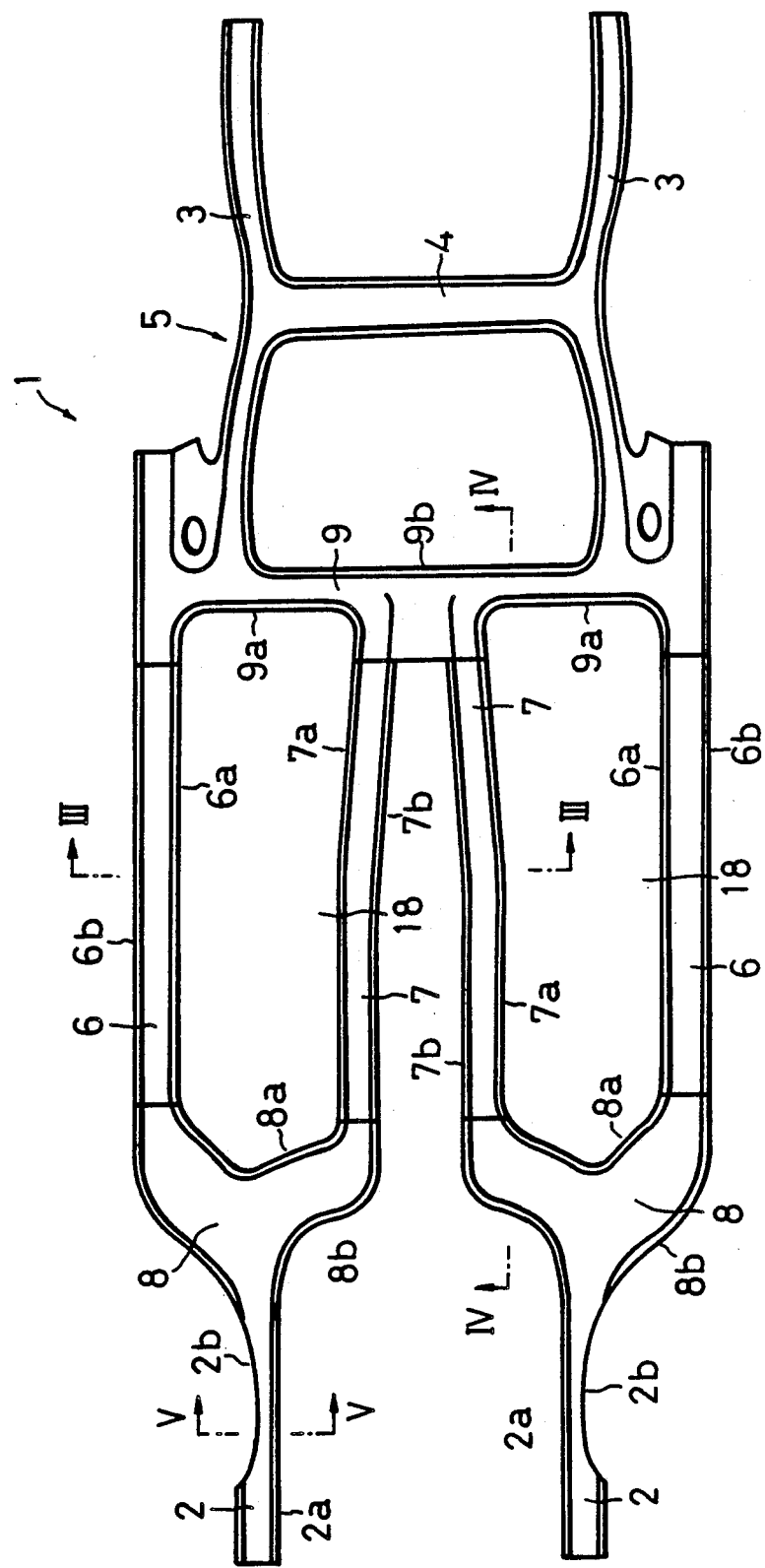
FIG. 2 is a plan view of the underframe of FIG. 1.

Referring to FIGS. 1 and 2, an underframe embodying the present invention is shown and generally designated by the reference numeral 1. As shown, the underframe 1 includes a pair of front side frames 2 and a pair of rear side frames 3. The front side frames 2 are located at the laterally opposite sides of a front part of a vehicle body while the rear side frames 3 are located at the laterally opposite sides of a rear part of the same. The rear side frames 3 are interconnected by a rear cross member 4 to constitute a rear frame 5.

A pair of side sill frames 6 are provided between the front side frames 2 and the rear side frames 3 and at laterally opposite sides of a floor section of a passenger compartment, each side sill frame 6 extending in the longitudinal direction of the vehicle body. A pair of parallel tunnel frames 7 are positioned at the intermediate between the side sill frames 6 and each extends in the longitudinal direction of the vehicle body. The side sills 6 and the tunnel frames 7 which are located at laterally opposite sides are each interconnected by a front outrigger 8 at their front ends. The front outrigger 8 is in turn connected to one of the front side frames 2 which is associated therewith. The side sill frames 6 and the tunnel frames 7 are interconnected at their rear ends by a middle cross member 9 which extends in the lateral direction of the vehicle body and is in turn connected to the rear frame 5.

The front side frames 2, rear side frames 3, rear cross member 4, side sill frames 6, tunnel frames 7, front outriggers 8 and middle cross member 9 are each provided with a top-open channel configuration. The front side frame 2, front outrigger 8 and the front bent portion of the side sill frame 6 and tunnel frame 7 are formed integrally with other by press-forming a single metal plate. Likewise, the rear side frames 3, rear cross member 4, middle cross member 9 and the rear bent portions of the side sill frames 6 and tunnel frames 7 are formed integrally with each other by press-forming a metal plate. More specifically, only the straight portions of the side sill frames 6 and those of the tunnel frames 7 are produced independently of the others.

The portion where the front end of the straight portion of each side sill frame 6 and that of the associated tunnel frame 7 should be connected to the front side frame 2, i.e., the front bent portions of the side sill frame 6 and tunnel frame 7 and the front outrigger 8 are each so configured as to smoothly merge into the frames 2, 6 and 7. Also, the portion where the rear end of the straight portion of each side frame 6 and that of the associated tunnel frame 7 should be connected to the rear frame 5, i.e., the rear bent portions of the side sill frame 6 and tunnel frame 7 and the middle cross member 9 are each so configured as to smoothly merge into the frames 5, 6 and 7. More specifically, the longitudinally opposite ends of the straight portion of each of the side sill frames 6 and tunnel frames 7 are individually abutted against the associated connecting portions over their entire outer surfaces and then welded to the latter. FIG. 2 shows such various members which are jointed together by welding. In FIG. 2, the channel of each front side frame 2 is divided at the front outrigger 8 to merge into the side sill frame 6 on one hand and into the tunnel frame 7 on the other hand, then into the middle cross member 9, and then into the rear side frame 3 and rear cross member 4.

Figure 3:
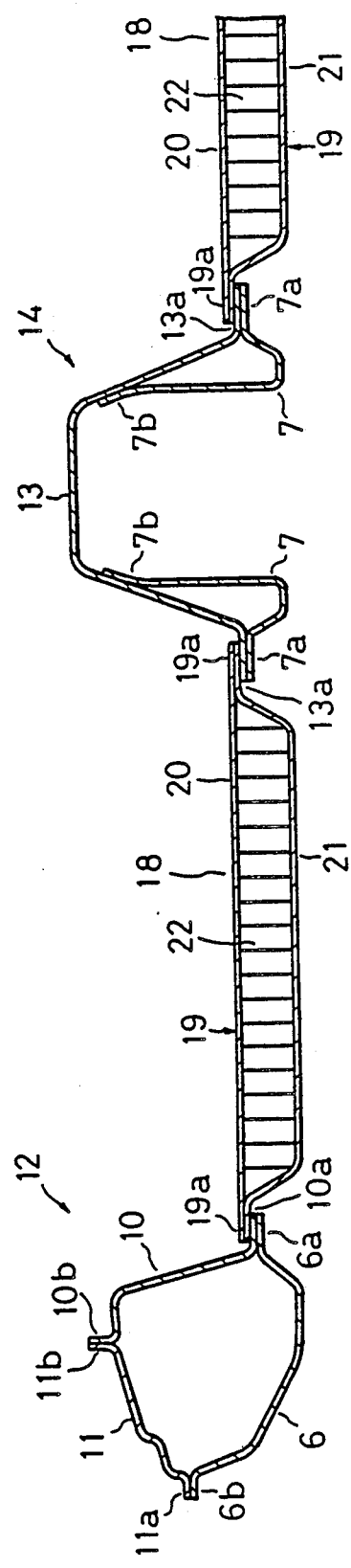
FIG. 3 is a vertical section along line III—III of FIG. 2.

As shown in FIGS. 1 and 3, each side sill frame 6 has horizontal flanges 6a and 6b at opposite upper edges thereof. A sill inner pannel 10 having a flange 10a at its lower edge and a sill outer panel 11 having a flange 11a at its lower edge are rigidly connected to the side sill frame 6. More specifically, the flanges 10a and 11a are respectively abutted against and spot-welded to the flanges 6a and 6b of the side sill frame 6. The sill inner pannel 10 and the sill outer panel 11 are securely connected to each other at their upper flanges 10b and 11b. The side sill frame 6, sill inner panel 10 and sill outer panel 11 connected together as stated form a side sill 12 having a hollow closed section.

Each tunnel frame 7 has an outwardly horizontally extending flange 7a at its outer upper edge and an upwardly inclined flange 7b at its inner upper edge. A bottom-open tunnel panel 13 having a channel-like configuration covers both of the upper surfaces of such tunnel frames 7. The tunnel panel 13 is provided with flanges 13a at its opposite lower edges. The flanges 13a are individually spot-welded to the outer flanges 7a of the tunnel frames 7. The inner flanges 7b of the tunnel frames 7 are connected to the inner surfaces of the tunnel panel 13. The tunnel panel 13 and tunnel frames 7 connected together constitute a floor tunnel 14 which includes reinforcing portions each having a hollow closed section at opposite sides thereof.

Figure 4:
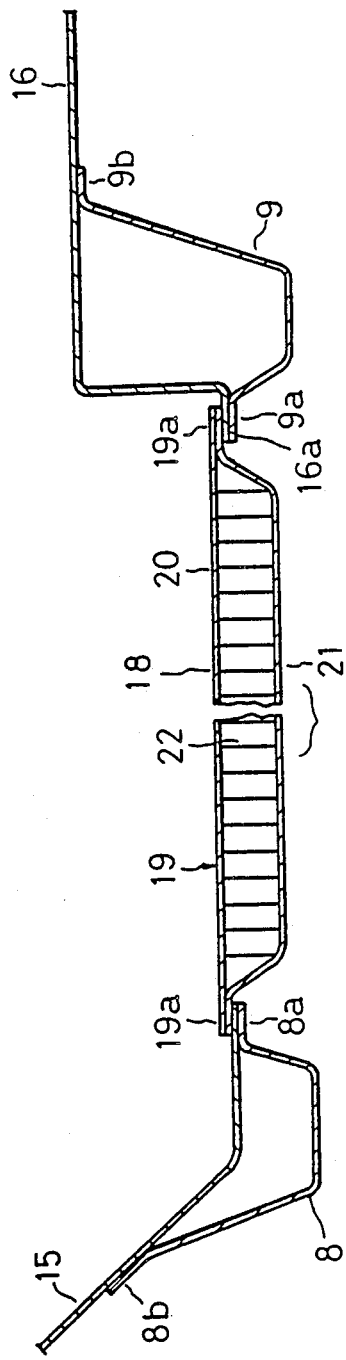
FIG. 4 is a vertical section along line IV—IV of FIG. 2.

As shown in FIGS. 1 and 4, each front outrigger 8 has a horizontally extending flange 8a and an upwardly inclined flange 8b at a rear and a front portion of its upper edge, respectively. A dashboard 15 is produced by press-forming a metal plate and mounted on the upper surface of the front outrigger 8. More specifically, the dashboard 15 is connected to the flange 8a of the outrigger 8 at its rear lower edge and to the flange 8b at its front inclined portion, defining a hollow closed space in cooperation with the outrigger 8.

The middle cross member 9 has horizontally extending flanges 9a and 9b at its front side and rear side, respectively. The upper surface of the middle cross member 9 is closed by a front end portion of a rear floor panel 16 which is jointed to the upper surface of the rear frame 5. The front end of the rear floor panel 16 is bent downward to terminate at a horizontal flange 16a. This flange 16a is connected to the front flange 9a of the middle cross member 9. The rear flange 9b of the middle cross member 9 is bonded to the lower surface of the rear floor panel 16. The rear floor panel 16 and the middle cross member 9 cooperate to define a hollow space having a closed section.

As depicted in FIG. 1, the downward bent of the rear floor panel 16 is provided with a recess 17 at its intermediate portion for receiving the rear end of the tunnel panel 13. A flange 17a is formed around the recess 17 to connect the rear end of the tunnel panel 13 and the front end of the rear floor panel 16. In this construction, the hollow closed spaces defined at opposite sides of the floor tunnel 14 by the tunnel panel 13 and tunnel frames 7 are communicated to the closed space which is defined by the front end portion of the rear floor panel 16 and middle cross member 9.

Front floor panels 19 are provided to individually close the openings 18 which are surrounded by the side sills 12, floor tunnel 14, dashboard 15 and rear floor panel 16 and associated with the floor of a passenger compartment. Each of the front floor panels 19 has a honeycomb sandwich structure which is constituted by a top plate 20, a bottom plate 21, and a honeycomb core 22 interposed between the plates 20 and 21. The top and bottom plates 20 and 21 are jointed together along their periphery to form flanges 19a. These flanges 19a are connected to the flanges 10a of the sill inner panels 10, the flanges 6a of the side sill frames 6, the flanges 13a of the tunnel panel 13, and the flanges 7a of the tunnel frames 7 and other flanges which surround the opening 18, whereby the front floor panel 19 is rigidly connected to the underframe 1.

Figure 5:
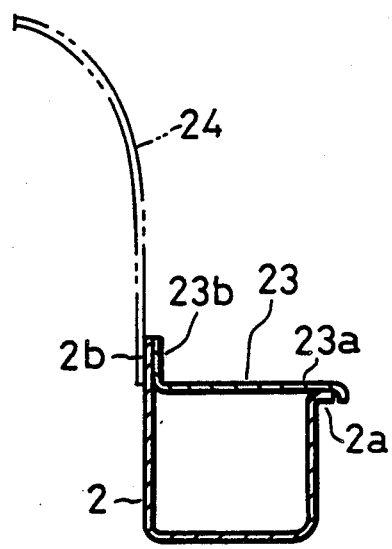
FIG. 5 is a vertical section along line V—V of FIG. 2.

As shown in FIGS. 1 and 5, each front side frame 2 has a horizontal flange 2a and an upward extension 2b at the inner and outer sides thereof, respectively. An upper panel 23 is connected to the upper surface of the front side frame 2. Specifically, the upper panel 23 is connected at its horizontal extension 23a to the horizontal flange 2a of the front side frame 2 and at its vertical flange 23b to the upward extension 2b. A wheel house 24 is connected at its lower end to the upper extension 2b of the front side frame 2 which is connected to the vertical flange 23b of the upper panel 23. Further, the upper panel 23 is provided with a flange 23c at its rear end which is to be connected to the front surface of the dashboard 15. When the upper panel 23 and the front side frame 2 are connected together, they define a hollow space having a closed section and communicating to the hollow closed space which is defined by the outrigger 8 and dashboard 15.

As shown in FIG. 1, the rear frame 5 is also provided with horizontal flanges along its upper edges. The rear floor panel 16 is laid on and connected to those flanges of the rear frame 5 to define hollow spaces each having a closed section.

As stated above, all the members of the underframe 1 are provided with a top-open channel configuration and therefore connected together over their entire surfaces with sufficient strength. Moreover, since such connections are limited to the front and rear ends of the straight portions of the side sill frames 6 and tunnel frames 7, easy welding and accurate assembly are promoted.

The front side frames 2, rear side frames 3, side sill frames 6 and tunnel frames 7 are each provided with a top-open channel configuration. Hence, the front outriggers 8 connecting the front side frames 2 and the side sill frames 6 and tunnel frames 7 and/or the middle cross member 9 connecting the rear frame 5 and the side sill frames 6 and tunnel frames 7 may also be provided with a top-open channel configuration to be formed integrally with the front side frames 2 or the rear frame 5. This reduces the number of structural parts, eliminates the operations otherwise needed to connect them together to thereby enhance efficient production, and increases positional accuracy.

When only the straight portions of the side sill frames 6 and those of the tunnel frames 7 are separate from the others, they may be produced in various lengths for accommodating various kinds of motor vehicles which are different in wheelbase from each other.

In a vehicle body with such an underframe 1, the hollow spaces defined by the underframe 1 and the panels of the vehicle body and each having a closed section are communicated to each other. The vehicle body, therefore, has a unitary framework which insures an extremely high efficiency as a framework, i.e. considerable strength and rigidity as a whole.

The tunnel frames 7 are connected to the underside of the tunnel panel 13 which itself is provided with increased rigidity due to the channel configuration. In addition, since a sufficient space is defined in the up-down direction beneath the tunnel panel 13, the dimension of the tunnel panel 7 in the up-down direction can be increased without causing it to protrude excessively downward. This increases the moment of inertia of area of the hollow closed spaces which are defined by the tunnel frames 7 and tunnel panel 13. Consequently, the vehicle body with the tunnel frames 7 achieves considerable rigidity against bending forces.

Figure 6:
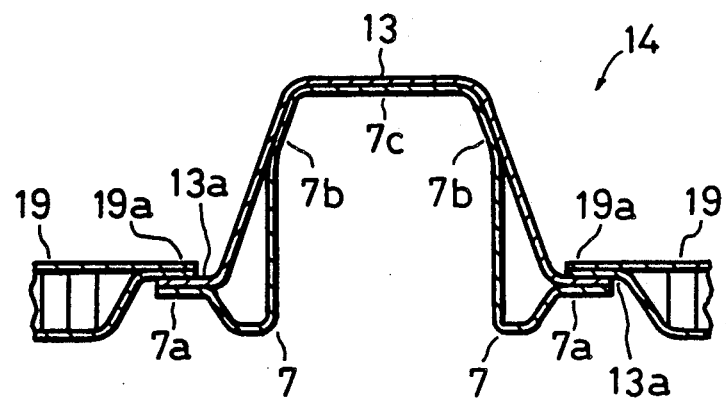
FIG. 6 is a vertical section showing another embodiment of the present invention.

As shown in FIG. 6, the tunnel frames 7 may be locally interconnected in the lengthwise direction and connected at their interconnecting portion 7c to the underside of the tunnel panel 13. In this case, the interconnecting portion 7c will give extra strength to the tunnel panel 13 and thereby effectively reinforce a portion of the tunnel panel 13 where any of a shift lever, hand brake, sheet belt anchors and the like is mounted to the floor tunnel 14. Such various parts are supported rigidly enough because their loads are transmitted to the tunnel frames 7.

The lower ends of the side sills 12 are constituted by the side sill frames 6 each having a top-open channel configuration and therefore having the flanges 6a and 6b at opposite sides thereof. Hence, it is not necessary to cause flanges downward, so that the dimension of the hollow closed spaces of the side sills 12 as measured in the up-down direction can be increased. It follows that the moment of inertia of area and therefore the bending strength of each side sill 12 can be increased by far to realize a vehicle body having desirable mechanical strength and rigidity.

In summary, it will be seen that the present invention provides a strong and rigid underframe of a motor vehicle in which side sill frames, tunnel frames and front side frames are individually provided with a top-open channel configuration and the front ends of straight portions of the side sill frames and tunnel frames are connected to the front side frames by connecting portions each having a top-open channel configuration, i.e., the channels of the frames are communicated to each other.

Since the tunnel frames are disposed in a floor tunnel portion, they contribute a great deal to the increase in the rigidity of the tunnel portion. The channel configuration of the side sill frames allows the effective height and therefore the moment of inertia of area of the side sills to be increased.

Various modifications will become possible for those skilled in the art after receiving the teachings of the present disclosure without departing from the scope thereof. For example, even the side sill frames 6 and tunnel frames 7 may be formed integrally with the other frames to make the entire underframe 1 unitary. If desired, the straight portions of the front side frames 2 and/or those of the rear side frames 3 may be produced as members which are separated from the others.

While the invention has been particularly shown and described in reference to preferred embodiments thereof, it will be understood by those skilled in the art that changes in form and details may be made therein without departing from the spirit and scope of the invention.

What is claimed is:

1. An underframe of a motor vehicle, comprising
   front side frames provided in a front portion of a vehicle body;
   side sill frames extending in a longitudinal direction of the vehicle body at opposite sides of a floor portion of a passenger compartment; and
   tunnel frames extending in the longitudinal direction of the vehicle body at opposite sides of a floor tunnel which is located at the intermediate between said side sill frames;
   said front side frames, said side sill frames and said tunnel frames each having a top-open channel configuration;
   said side sill frames and said tunnel frames each including a straight portion which is connected at a front end of said straight portion to a respective one of said front side frames by a connecting portion having a top-open channel configuration, said top-open channel configuration of said connecting portion being contiguous, with said top-open channel configuration of said respective front side frame, said tunnel frames being connected to an underside of opposite sides of a single tunnel panel to form hollow spaces, each hollow space having a closed section at opposite sides of said floor tunnel.

2. An underframe as claimed in claim 1, wherein said front side frame and said connecting portion are formed integrally with each other.

3. An underframe as claimed in claim 1, wherein said connecting portion is shaped such that a lower end portion of a dashboard is connectable to an upper surface of said connecting portion.

4. An underframe as claimed in claim 1, wherein each of said side sill frames is provided with substantially horizontal flanges at opposite upper edges of said side sill frame, a side sill panel having a bottom-open channel configuration being connected to said flanges of said side sill frame at flanges which are provided at opposite lower edges of said side sill panel.

5. An underframe as claimed in claim 1, wherein said tunnel frames have upper inner ends which are connected to each other by a interconnecting portion, said interconnecting portion being connected to a lower surface of said tunnel panel.

6. An underframe as claimed in claim 1, wherein a rear frame is connected to the rear ends of said straight portions of said side sill frames and said tunnel frames through connecting portions which are formed integrally with each other to have top-open channel configurations which are contiguous with said side sill frames and said tunnel frames.

* * * * *